United States Patent [19]

Arnoldussen

[11] 3,722,829

[45] Mar. 27, 1973

[54] CASSETTE

[75] Inventor: Theodorus Franciscus Arnoldussen, Emmasingel, Eindhoven, Netherlands

[73] Assignee: U.S. Philips Corporation, New York, N.Y.

[22] Filed: Dec. 28, 1970

[21] Appl. No.: 101,549

[30] Foreign Application Priority Data

Jan. 16, 1970 Netherlands ........................7000677

[52] U.S. Cl. ..................242/199, 242/71.2, 242/210

[51] Int. Cl. ............................................G11b 23/10

[58] Field of Search......242/198, 197, 200, 204, 192, 242/210, 71.2; 274/4 C, 11 C; 352/78 R, 72

[56] References Cited

UNITED STATES PATENTS

| | | | |
|---|---|---|---|
| 2,374,038 | 4/1945 | Ress | 242/192 |
| 2,379,690 | 7/1945 | Cunningham | 242/71.2 UX |
| 3,468,497 | 9/1969 | Kelley | 242/192 |

*Primary Examiner*—George F. Mautz
*Attorney*—Frank R. Trifari

[57] ABSTRACT

A cassette for use in an apparatus for the recording and/or playback of recording on or from a strip-shaped record carrier, which cassette contains a take-up core and a supply core for the record carrier and a single, flanged, freely rotatable, and displaceable, guide roller which is mounted so as to be floating and engages the outer circumferences of the record carrier rolls wound on the supply and take-up cores. The flanges of the roller simultaneously guides the outer turns of both record carrier rolls.

3 Claims, 2 Drawing Figures

Patented March 27, 1973

3,722,829

2 Sheets-Sheet 1

INVENTOR

THEODORUS F ARNOLDUSSEN

BY

AGENT

Figure 1:
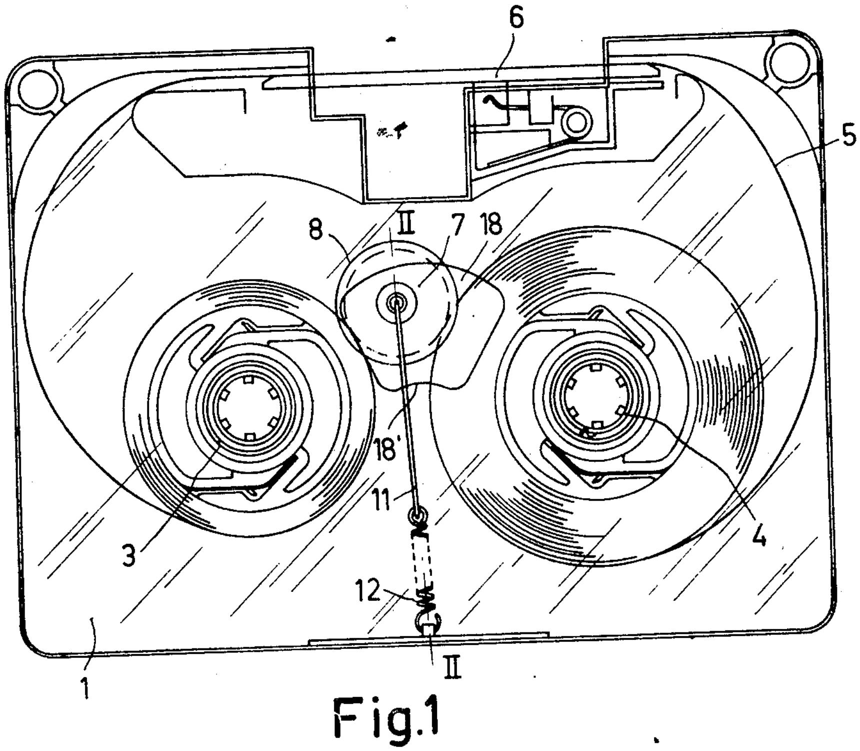

INVENTOR
THEODORUS F. ARNOLDUSSEN
BY
AGENT

CASSETTE

The invention relates to a cassette for use in an apparatus for the recording and/or play-back of recordings on or from a strip-shaped record carrier. The cassette includes a tape-up core and a supply core for the record carrier and a flanged, freely rotatable, and displaceable guide roller. The roller may engage the outer circumference of a record carrier wound on a core and the flanges of the roller are capable of guiding the outer turns of a record carrier wound on a core.

A cassette of this type is described, for example, in German Patent Specification No. 1,122,728. This known cassette is provided with two guide rollers which are mounted on levers displaceable by spring force, one roller engaging the outer circumference of the record carrier wound on the take-up core and the other roller engaging the outer circumference of the record carrier wound on the supply core. The two rollers are disposed at the outer sides of the record carrier rolls, i.e. in the spaces between the said rolls and the lateral walls of the cassette, and hence require additional space in the cassette.

According to the invention a cassette of the type described above, is provided with a single guide roller which is arranged so as to be floating. When the record carrier has been wound on the cores the roller contacts the outer circumference of the record carrier rolls wound on the supply core and on the take-up core, the flanges of the roller simultaneously guiding the outer turns of both rolls.

This allows a simplified and hence cheap cassette, the space of which is optimally utilized, which means that the size of the cassette may be reduced to a minimum. The displacement of the guide roller may be effected either in known manner by spring force or, when the cassette is used in a vertical position, under the influence of its own weight.

When the record carrier is a perforated film arranged to be fed forward by a claw mechanism external to the cassette, the invention provides another important advantage. In such film cassettes the claws have to pull the film from the take-off or supply core, which requires additional work, may damage the sprocket holes and adversely affects the desired stable image position during the projection of the film. By using the guide roller of the present invention the said disadvantages are obviated. At the take-up side the roller is set into rotation by engagement with a roll of film driven from a projector, and may also serve as a driving roller for the film roll at the take-off side, which is also engaged by the roller. Thus, the two film rolls are driven at substantially the same peripheral velocity, so that the claw mechanism is prevented from jerking at the film at the take-off side.

In a suitable embodiment of the invention, in which the roller is mounted on a spring-loaded support, abutment means for the guide roller are provided which, when the cassette does not contain a record carrier, prevent the roller from being moved between the two cores by the spring action. According to the invention, the abutment means preferably are constituted by a boundary wall of a recess formed in at least one of two facing inner walls of the cassette which extend at right angles to the axis of rotation of the roller, and also by a projecting portion of the support on which the guide roller is mounted, which portion extends into the said recess and may abut against the boundary wall of the recess when the support is displaced by the spring action. These steps according to the invention provide the advantage that with the use of a minimum number of component parts cheap but efficient means have been obtained which, when the cassette is not filled with a record carrier, prevent the guide roller from popping between the two cores.

A suitable embodiment of the invention consists in that the support on which the guide roller is mounted is a U-shaped bracket which extends between the two cores, a drawstring having one end attached to the bracket portion which joins the limbs of the U and having the other end secured in the cassette. The U-shaped bracket preferably has been bent from wire material, the free ends of the limbs of the U being bent inward and forming pivots on which the roller is mounted, whilst near the said inwardly bent ends the limbs of the U have outwardly bent parts which engage in recesses formed in facing inner walls of the cassette.

Figure 2:
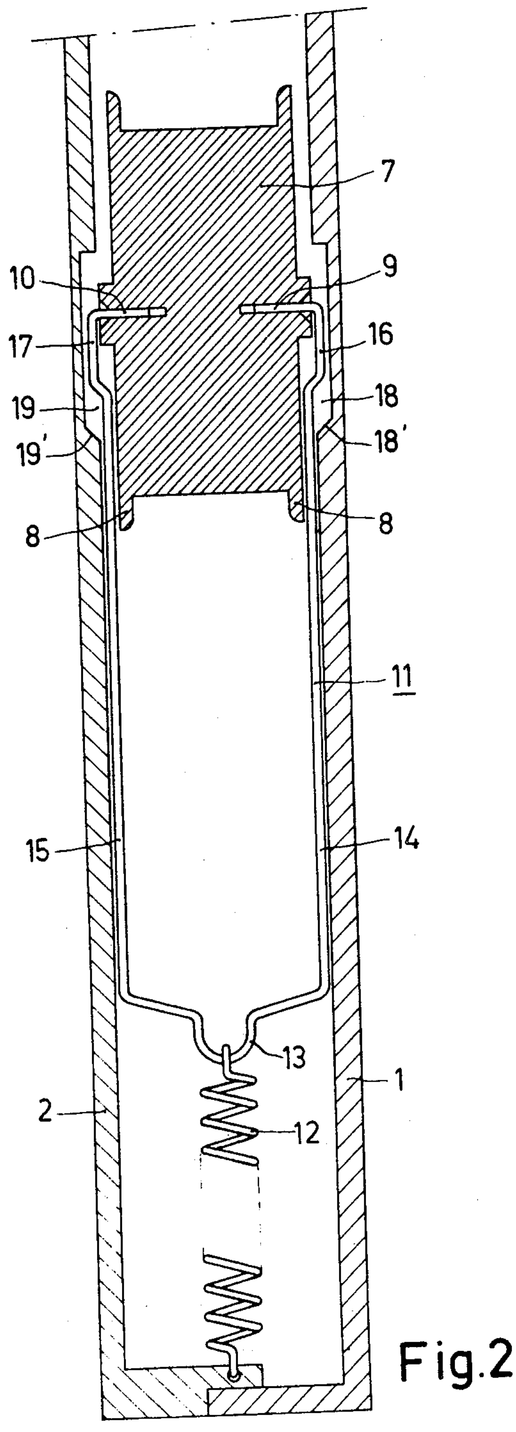

An embodiment of a cassette according to the invention will now be described more fully with reference to the accompanying diagrammatic drawings, in which:

FIG. 1 is a top plan view of a cassette according to the invention made of a transparent material, and FIG. 2 is a sectional view taken on the line II—II of the FIG. 1.

Referring to the Figures, a cassette comprises a two-part casing 1, 2 which contains a take-up core 4 and a supply core 3 for a strip-shaped record carrier 5, which in the present embodiment is a perforated film. The cassette is provided with a pressure bar 6, which may be a known member and is not described in further detail, since it is not regarded as essential to the invention.

In the area between the two cores 3 and 4 there is disposed a guide roller 7 which is in contact with the outer circumferences of the roll of film 5 wound on the supply core 3 and of that wound on the take-up core 4. The roller 7 is provided with flanges 8 which guide the outer turns of both film rolls.

The guide roller 7 is mounted for free rotation on pivots 9 and 10 constituted by inwardly bent ends of a U-shaped bracket 11, which is bent from wire and extends between the cores 3 and 4. One end of a draw spring 12 is attached to a bracket portion 13 which joins limbs 14 and 15 of the U, the other end of the spring being secured to the casing part 2 of the cassette. Thus, the assembly of the roller 7 and the bracket 11 is mounted so as to be floating. Near the pivots 9 and 10 the limbs 14 and 15 have outwardly bent portions 16 and 17, which project into recesses 18 and 19 formed in facing inner walls of the cassette casing parts 1 and 2. When the guide roller 7 is displaced under the influence of the spring 12, the portions 16 and 17 of the bracket may engage boundary walls 18' and 19' of the recesses 18 and 19, which arrangement prevents the roller from passing between the two cores 3 and 4 when the cassette does not contain a film.

What is claimed is:

1. A film cassette for use in an apparatus for recording and/or playback of filmed images on stripped shaped film comprising a casing formed of an upper surface, a bottom surface, two opposing and parallel side walls and two opposing and parallel end walls, said side and end walls interconnecting said said upper and lower surfaces, a supply core and a take-up core housed within said cassette between said upper and lower surfaces and being laterally spaced apart, a film being wound in rollers and carried by said cores and being guided within said casing from one core to the other and past one of the side walls of the casing, a flanged guide roller rotatably mounted on a roller support within said casing and arranged for displacement within the casing, said guide roller being situated so that its circumference is in contact with the outer circumference of the film rolls wound on both the take-up core and the supply core, means for biasing said roller so as to remain in contact with the outer circumference of each film roll, said flanges of the guide roller guiding the outer turns of both film rolls, said roller support comprising a U-shaped bracket arranged within the casing and extending inbetween said film rolls, and said means for biasing said guide roller comprising a drawspring having one end thereof attached to that portion of said bracket joining the limbs of said U, and the other end thereof secured to said casing.

2. The cassette according to claim 1 wherein said U-shaped bracket is formed of wire material, the free ends of the limbs of the U being bent inwardly so as to form a pivot on which the guide roller is rotatably mounted, and each limb being provided with an outwardly bent projection, said projections being located near the ends of the limbs.

3. The cassette according to claim 2 further comprising a recess formed on the inner face of one of the surfaces, said recess extending at right angles to the axis of rotation of the guide roller, said projections on said bracket extending into said recess so that when the support is displaced under the influence of said drawspring, the projection may abut against a boundary wall of the recess thereby preventing the guide roller from passing between the two cores under the influence of the drawspring when the cassette contains no film.

* * * * *